(12) United States Patent
Adachi et al.

(10) Patent No.: US 8,470,057 B2
(45) Date of Patent: Jun. 25, 2013

(54) METHOD FOR PRODUCING ALKALINE PRIMARY BATTERY

(75) Inventors: Mitsuji Adachi, Osaka (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/234,742

(22) Filed: Sep. 16, 2011

(65) Prior Publication Data

US 2012/0186074 A1 Jul. 26, 2012

(30) Foreign Application Priority Data

Jan. 26, 2011 (JP) ................... 2011-014045

(51) Int. Cl.
*H01M 4/82* (2006.01)
*H01M 6/00* (2006.01)

(52) U.S. Cl.
USPC ....... 29/623.4; 29/623.1; 29/623.2; 29/623.3; 29/623.5

(58) Field of Classification Search
None
See application file for complete search history.

(56) References Cited

U.S. PATENT DOCUMENTS

| 2003/0013011 A1 | 1/2003 | Shoji |
| 2006/0003224 A1* | 1/2006 | Adachi et al. ................. 429/206 |
| 2007/0154791 A1 | 7/2007 | Adachi et al. |
| 2007/0248879 A1* | 10/2007 | Durkot et al. ................. 429/130 |
| 2008/0038634 A1* | 2/2008 | Bushong et al. ............. 429/206 |

FOREIGN PATENT DOCUMENTS

| JP | 11-329396 | 11/1999 |
| JP | 2005-071908 | 3/2005 |
| JP | 2009-163982 | 7/2009 |

\* cited by examiner

*Primary Examiner* — Patrick Ryan
*Assistant Examiner* — Yoshitoshi Takeuchi
(74) *Attorney, Agent, or Firm* — McDermott Will & Emery LLP

(57) ABSTRACT

A method for producing an alkaline primary battery includes: (1) forming a cylindrical positive electrode having a hollow; (2) inserting a cylindrical separator with a bottom into the hollow of the positive electrode, the separator including: a wound cylindrical portion; and a bottom portion that is substantially U-shaped in cross-section, the bottom portion covering an opening of the cylindrical portion at a lower end thereof and having an upstanding portion that extends along a lower outer face of the cylindrical portion; and (3) injecting an electrolyte into the separator. The amount of the electrolyte injected into the separator in the step (3) is sufficient to impregnate the positive electrode and the separator and immerse a lower end of the cylindrical portion of the separator in the electrolyte remaining in the separator, thereby bringing the lower end of the cylindrical portion into contact with the upstanding portion.

10 Claims, 2 Drawing Sheets

METHOD FOR PRODUCING ALKALINE PRIMARY BATTERY

FIELD OF THE INVENTION

This invention relates to methods for producing alkaline primary batteries, and more particularly to an improvement in the step of injecting an electrolyte into a battery case in a method for producing an alkaline primary battery (hereinafter may also be referred to as an "alkaline battery").

BACKGROUND OF THE INVENTION

A typical method for producing an alkaline battery includes the steps of:

(A) inserting at least one positive electrode pellet into a cylindrical battery case with a bottom and pressing the positive electrode pellet to form a cylindrical positive electrode having a hollow and adhering closely to an inner face of the battery case;

(B) inserting a cylindrical separator with a bottom into the hollow of the positive electrode inside the battery case;

(C) injecting an electrolyte into the separator to impregnate the positive electrode and the separator with the electrolyte;

(D) filling a gelled negative electrode into the separator;

(E) inserting a negative electrode current collector into the negative electrode; and (F) sealing an opening of the battery case.

In Patent Document 1, in the step (B), a cylindrical separator with a bottom is inserted into the hollow of the positive electrode inside the battery case. This separator includes: a wound cylindrical portion; and a bottom portion that is substantially U-shaped in cross-section, the bottom portion covering an opening of the cylindrical portion at a lower end of the cylindrical portion and having an upstanding portion that extends along a lower inner face of the cylindrical portion.

However, when the battery is dropped or subjected to a large impact or vibrations during transportation or the like, the gelled negative electrode flows, thereby displacing the bottom portion of the separator. As a result, the negative electrode may leak from between the cylindrical portion of the separator and the upstanding portion of the bottom portion of the separator, thereby causing an internal short circuit.

To prevent such leakage of the negative electrode, in Patent Document 2, a cylindrical separator with a bottom is inserted into the hollow of the positive electrode inside the battery case in the step (B). This separator includes: a wound cylindrical portion; and a bottom portion that is substantially U-shaped in cross-section, the bottom portion covering an opening of the cylindrical portion at a lower end of the cylindrical portion and having an upstanding portion that extends along a lower outer face of the cylindrical portion.

In Patent Document 3, the bottom portion of the separator of Patent Document 1 and the bottom portion of the separator of Patent Document 2 are combined to form a separator having two bottom portions, and the lower end of the cylindrical portion of the separator is sandwiched between two upstanding portions of the bottom portions of the separator.

Patent Document 1: Japanese Laid-Open Patent Publication No. 2009-163982

Patent Document 2: Japanese Laid-Open Patent Publication No. Hei 11-329396

Patent Document 3: Japanese Laid-Open Patent Publication No. 2005-071908

BRIEF SUMMARY OF THE INVENTION

However, in Patent Document 2, the major part of the cylindrical portion of the separator is fitted to the inner side face of the positive electrode, but the lower end of the cylindrical portion of the separator is curved inward relative to the other parts since it overlaps the upstanding portion of the bottom portion of the separator. Thus, when the electrolyte injected into the separator is absorbed by the separator and the positive electrode in the step (C), the lower end of the cylindrical portion of the separator comes apart from the upstanding portion of the bottom portion of the separator and bends inward. If a negative electrode is filled in such a state, the bend of the separator impedes the permeation of the negative electrode throughout the separator. As a result, the negative electrode overflows from the separator, thereby coming into contact with the positive electrode to cause an internal short circuit.

In Patent Document 3, inward bending of the cylindrical portion of the separator is reduced. However, since the separator has two bottom portions, the total thickness of the bottom portions of the separator increases. Thus, the amount of the negative electrode filled therein (negative electrode capacity) decreases and the internal resistance of the battery increases, thereby resulting in deterioration of battery performance.

Therefore, according to the technique of using two bottom portions of a separator, it is difficult to suppress deterioration of battery performance while suppressing inward bending of the lower end of the cylindrical portion of the separator.

One aspect of the method for producing an alkaline primary battery according to the invention includes the steps of:

(1) inserting at least one hollow cylindrical positive electrode pellet into a cylindrical battery case with a bottom and pressing the at least one positive electrode pellet to form a cylindrical positive electrode having a hollow and adhering closely to an inner face of the battery case;

(2) inserting a cylindrical separator with a bottom into the hollow of the positive electrode inside the battery case, the separator including: a wound cylindrical portion; and a bottom portion that is substantially U-shaped in cross-section, the bottom portion covering an opening of the cylindrical portion at a lower end of the cylindrical portion and having an upstanding portion that extends along a lower outer face of the cylindrical portion;

(3) injecting an electrolyte into the separator to impregnate the positive electrode and the separator with the electrolyte;

(4) filling a gelled negative electrode into the separator;

(5) inserting a negative electrode current collector into the negative electrode; and (6) sealing an opening of the battery case.

The amount of the electrolyte injected into the separator in the step (3) is sufficient to impregnate the positive electrode and the separator and immerse a lower end of the cylindrical portion of the separator in the electrolyte remaining in the separator without being absorbed by the positive electrode and the separator, thereby bringing the lower end of the cylindrical portion into contact with the upstanding portion of the bottom portion.

According to the invention, when the gelled negative electrode is filled into the separator, the lower end of the cylindrical portion of the separator is in contact with the upstanding portion of the bottom portion while being immersed in the electrolyte remaining in the separator. Therefore, the gelled negative electrode of predetermined amount is prevented from overflowing from the separator and is contained in the separator.

Also, inward bending of the lower end of the cylindrical portion of the separator can be suppressed without fixing the lower end of the cylindrical portion of the separator by sandwiching it between two bottom portions of a separator. Therefore, unlike the case of using two bottom portions of a separator, the thickness of the bottom portion of the separator does not increase, so that the amount of the negative electrode filled does not decrease and the internal resistance of the battery does not increase.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE INVENTION

DETAILED DESCRIPTION OF THE INVENTION

Figure 1:
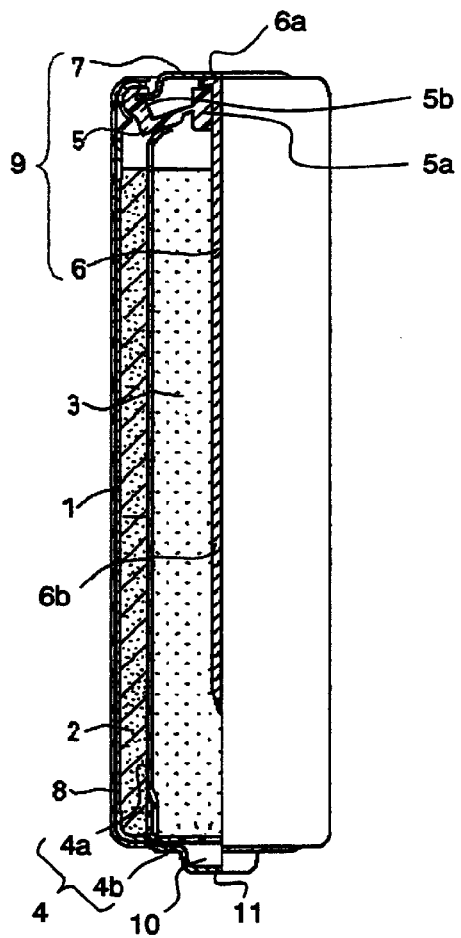
FIG. 1 is a partially sectional front view of an example of an alkaline primary battery produced by the method for producing an alkaline primary battery according to the invention.

The invention relates to a method for producing an alkaline primary battery, the method including the steps of:

(1) inserting at least one hollow cylindrical positive electrode pellet into a cylindrical battery case with a bottom and pressing the at least one positive electrode pellet to form a cylindrical positive electrode having a hollow and adhering closely to an inner face of the battery case;

(2) inserting a cylindrical separator with a bottom into the hollow of the positive electrode inside the battery case, the separator including: a wound cylindrical portion; and a bottom portion that is substantially U-shaped in cross-section, the bottom portion covering an opening of the cylindrical portion at a lower end of the cylindrical portion and having an upstanding portion that extends along a lower outer face of the cylindrical portion;

(3) injecting an electrolyte into the separator to impregnate the positive electrode and the separator with the electrolyte;

(4) filling a gelled negative electrode into the separator; and (5) inserting a negative electrode current collector into the negative electrode; and (6) sealing an opening of the battery case.

Upon the completion of the step (2), the major part of the cylindrical portion of the separator is fitted to the inner side face of the positive electrode, but the lower end of the cylindrical portion of the separator is not in contact with the inner side face of the positive electrode since the upstanding portion of the bottom portion of the separator is interposed therebetween. Therefore, the lower end of the cylindrical portion of the separator tends to curve inward.

According to the conventional method, after the step (2), a suitable amount of an electrolyte capable of exhibiting necessary battery performance is injected into the cylindrical separator with a bottom, and most of the electrolyte injected into the separator is absorbed by the separator and the positive electrode. The conventional method causes a problem of the lower end of the cylindrical portion of the separator coming apart from the bottom portion of the separator and bending inward.

To solve this problem, according to the invention, the amount of the electrolyte injected into the separator in the step (3) is sufficient to impregnate the positive electrode and the separator and immerse a lower end of the cylindrical portion of the separator in the electrolyte remaining in the separator without being absorbed by the positive electrode and the separator, thereby bringing the lower end of the cylindrical portion into contact with the upstanding portion of the bottom portion. As such, during the period from the step (3) to the step (4), the electrolyte remains in a lower part of the separator after the positive electrode and the separator have been impregnated, so that the lower end of the cylindrical portion of the separator is immersed in the electrolyte and kept in contact with the upstanding portion of the bottom portion. It should be noted that "the lower end" of the cylindrical portion of the separator immersed in the electrolyte does not necessarily refer to the entire part (hereinafter "the lower end part") of the cylindrical portion overlapping the upstanding portion of the bottom portion of the separator. Preferably, the lower end of the cylindrical portion is immersed in the electrolyte and most of the lower end part of the cylindrical portion is wet with the electrolyte. The upstanding portion of the bottom portion of the separator is provided along only the outer face of the cylindrical portion of the separator and is not provided along the inner face of the cylindrical portion.

The surface tension of the remaining electrolyte allows the lower end part of the cylindrical portion of the separator to come into close contact with the upstanding portion of the bottom portion of the separator, thereby suppressing the lower end part of the cylindrical portion of the separator from coming apart from the upstanding portion of the bottom portion of the separator and bending inward. It is therefore possible to suppress a decrease in the internal volume of the separator (the volume of the negative electrode filled) due to such inward bending and overflowing of the negative electrode from the separator when the negative electrode is filled into the separator.

Inward bending of the lower end part of the cylindrical portion of the separator can be suppressed without using two separator bottom portions to fix the lower end part of the cylindrical portion of the separator. Therefore, unlike the case of using two separator bottom portions, the thickness of the bottom portion of the separator does not increase, so that the amount of the negative electrode filled does not decrease and the internal resistance of the battery does not increase.

Also, in the step (2), since the bottom portion of the separator has, at the circumference thereof, the upstanding portion which extends along the lower outer face of the cylindrical portion of the separator, leakage of the negative electrode from the lower part of the separator is suppressed.

In the step (3), the ratio of the weight $W_2$ of the remaining electrolyte to the weight $W_1$ of the electrolyte injected into the separator, i.e., the ratio $W_2/W_1$, is preferably from 3/100 to 11/100, and more preferably from 5/100 to 9/100. By setting $W_2/W_1$ to 3/100 or more, inward bending of the lower end part of the cylindrical portion of the separator can be suppressed in a reliable manner. By setting $W_2/W_1$ to 11/100 or less, when the negative electrode is filled into the separator, overflowing of the negative electrode from the separator together with the remaining electrolyte can be suppressed in a reliable manner.

In order to cause the separator and the positive electrode to absorb a sufficient amount of electrolyte in a short period of time, it is preferable in the step (3) to impregnate the positive electrode and the separator with the electrolyte at a reduced pressure. Even when the pressure is reduced with the electrolyte remaining in the separator, the surface tension of the remaining electrolyte allows the lower end part of the cylindrical portion of the separator to come into close contact with the upstanding portion of the bottom portion of the separator, thereby suppressing inward bending of the lower end part of the cylindrical portion of the separator.

The electrolyte injected into the separator in the step (3) is preferably a potassium hydroxide aqueous solution with a concentration of 32 to 40% by weight, and more preferably a potassium hydroxide aqueous solution with a concentration of 34 to 38% by weight. By setting the potassium hydroxide concentration in the electrolyte to 32% by weight or more, the electrolyte can provide high electrical conductivity. By setting the potassium hydroxide concentration in the electrolyte to 40% by weight or less, the battery can provide good intermittent discharge characteristics.

In terms of the adhesion between the fibers, the cylindrical portion of the separator preferably includes polyvinyl alcohol fibers (vinylon).

It should be noted, however, that polyvinyl alcohol tends to be hydrolyzed in an electrolyte comprising a potassium hydroxide aqueous solution with a concentration of 35% by weight or less. Thus, according to the conventional production method in which most of the electrolyte injected into the separator is absorbed by the separator and the positive electrode, the hydrolysis lowers the strength of the cylindrical portion of the separator, and the lower end part of the cylindrical portion of the separator strongly tends to bend inward.

Contrary to this, according to the invention, even when using an electrolyte comprising a potassium hydroxide aqueous solution with a concentration of 35% by weight or less, the surface tension of the remaining electrolyte allows the lower end part of the cylindrical portion of the separator including polyvinyl alcohol fibers to come into close contact with the upstanding portion of the bottom portion of the separator.

The positive electrode formed in the step (1) includes manganese dioxide and graphite, and the total of the weight $M_1$ of manganese dioxide and the weight $M_2$ of graphite, i.e., the total $M_1+M_2$, is preferably 3.05 to 3.33 g per 1 $cm^3$ of the positive electrode formed in the step (1).

By setting the total $M_1+M_2$ of the weight $M_1$ of manganese dioxide and the weight $M_2$ of graphite to 3.05 g or more per 1 $cm^3$ of the positive electrode, it is possible to lower the electrolyte absorbing speed of the positive electrode to a suitable extent in the step (3) without impairing the capacity and electrolyte retention ability of the positive electrode, and suppress inward bending of the lower end part of the cylindrical portion of the separator in a reliable manner. Also, when the positive electrode is formed with a die, by setting the total $M_1+M_2$ of the weight $M_1$ of manganese dioxide and the weight $M_2$ of graphite to 3.33 g or less per 1 $cm^3$ of the positive electrode, the positive electrode can be formed without subjecting the die to an excessive load. More preferably, $M_1+M_2$ is set to 3.14 to 3.30 g.

An example of an alkaline primary battery produced by the above production method is hereinafter described with reference to FIG. 1.

A cylindrical positive electrode 2 with a hollow adheres closely to the inner face of a cylindrical battery case 1 with a bottom. A cylindrical separator 4 with a bottom is disposed in the hollow of the positive electrode 2. A gelled negative electrode 3 is filled into the separator 4. The separator 4 comprises a cylindrical portion 4a and a bottom portion 4b. The cylindrical portion 4a of the separator is fitted to the inner side face of the positive electrode 2, and the bottom portion 4b of the separator is disposed on the bottom of the battery case 1. The bottom portion 4b of the separator has, at the circumference thereof, an upstanding portion that extends along the outer face of the cylindrical portion 4a of the separator. The opening of the battery case 1 is sealed with a seal unit 9. The seal unit 9 comprises a gasket 5, a negative terminal plate 7 serving as a negative terminal, and a negative electrode current collector 6. The negative electrode current collector 6 is inserted into the negative electrode 3. A body 6b of the negative electrode current collector 6 is inserted into a throughhole formed in a central cylindrical portion 5a of the gasket 5, while a head 6a of the negative electrode current collector is welded to a central flat portion of the negative terminal plate 7. The open edge of the battery case 1 is crimped onto the brim of the negative terminal plate 7 with an outer cylindrical portion 5b of the gasket 5 interposed therebetween. The outer surface of the battery case 1 is covered with an outer label 8.

An example of the method for producing an alkaline primary battery with the structure illustrated in FIG. 1 is described below.

[Step (1)]

A graphite powder serving as a conductive agent is added to a manganese dioxide powder serving as a positive electrode active material to obtain a mixture. An electrolyte is added to this mixture, which is then evenly mixed with a mixer or the like. The resulting mixture is pressed into flakes of a positive electrode mixture. The positive electrode mixture flakes are crushed to a certain particle size, to obtain granules of the positive electrode mixture (hereinafter "electrode mixture granules"). The mean granule size of the electrode mixture granules is, for example, 0.4 to 0.7 mm. The electrode mixture granules are classified with a sieve, and granules of 10 to 100 mesh are compression molded into the shape of a hollow cylinder, to obtain positive electrode pellets.

In terms of the balance between the capacity and conductivity of the positive electrode, the amount of graphite added is preferably 3 to 10 parts by weight per 100 parts by weight of manganese dioxide.

In terms of the capacity and packing properties of the positive electrode, the mean particle size of manganese dioxide is preferably 30 to 70 μm. In order to lower the electrolyte absorbing speed of the positive electrode to a suitable extent and suppress inward bending of the lower end part of the cylindrical portion of the separator in a more reliable manner, the mean particle size of manganese dioxide is more preferably 30 to 50 μm. As used herein, mean particle size refers to the median diameter (D50) in a volume basis particle size distribution. Mean particle size can be determined by using, for example, a laser diffraction/scattering particle size distribution analyzer (LA-920) available from Horiba, Ltd.

In terms of the conductivity and packing properties of the positive electrode, the mean particle size of graphite is preferably 5 to 20 μm. In order to lower the electrolyte absorbing speed of the positive electrode to a suitable extent and suppress inward bending of the lower end part of the cylindrical portion of the separator in a more reliable manner, the mean particle size of graphite is more preferably 8 to 15 μm.

In terms of the balance between the packing properties, capacity, and conductivity of the positive electrode, the ratio of the mean particle size $P_1$ of manganese dioxide to the mean particle size $P_2$ of graphite, i.e., the ratio $P_1/P_2$, is preferably from 2 to 6. In terms of the electrolyte absorbing speed of the positive electrode, $P_1/P_2$ is more preferably from 3 to 4.5.

The amount of electrolyte added in the step (1) is preferably 1 to 5 parts by weight per 100 parts by weight of the total of manganese dioxide and graphite.

A plurality of positive electrode pellets are inserted into the cylindrical battery case 1 with a bottom, and are pressed by using a predetermined die, to obtain the hollow cylindrical positive electrode 2 adhering closely to the battery case 1. At this time, the positive electrode pellets are coaxially stacked so that the hollows of the positive electrode pellets communicate with one another. The number of the positive electrode pellets may be one.

The total weight of manganese dioxide and graphite per 1 $cm^3$ of the positive electrode formed in the step (1) is preferably 3.05 to 3.33 g, and more preferably 3.14 to 3.30 g.

By setting the total weight of manganese dioxide and graphite per 1 $cm^3$ of the positive electrode to 3.33 g or less, the positive electrode can be formed without subjecting the die to an excessive load. By setting the total weight of manganese dioxide and graphite per 1 $cm^3$ of the positive electrode to 3.05 g or more, it is possible to lower the electrolyte absorbing speed of the positive electrode to a suitable extent in the step (3) without impairing the capacity and electrolyte retention ability of the positive electrode. It is thus possible to suppress inward bending of the separator in a more reliable manner.

After the positive electrode adhering closely to the battery case 1 is prepared, and before the separator and the negative electrode are disposed, the outer face of the battery case 1 near the opening is recessed to form a step 1a which protrudes inward in the battery case 1. The battery case 1 can be obtained by, for example, making a can from a nickel plated steel plate. As a can-making method, for example, DI (Drawing and Ironing) is employed.

[Step (2)]

Figure 2:
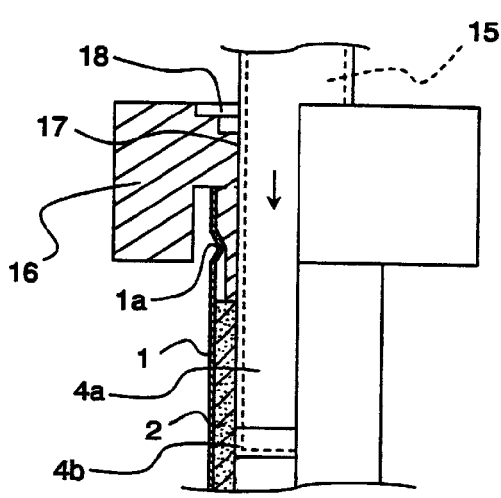
FIG. 2 illustrates the step (2) of the method for producing an alkaline primary battery according to the invention, in which the cylindrical and bottom portions of a separator are being inserted into the hollow of a positive electrode.

As illustrated in FIG. 2, the separator is inserted into the hollow of the positive electrode 2 by using a jig 16 which has a cylindrical pin 15 and a hole 17 through which the separator fitted to the pin 15 is passed. The jig 16 is attached to the opening of the battery case 1 so that the hole 17 communicates with the hollow of the positive electrode 2. The jig 16 has, in the upper face thereof, a recess 18 for receiving the material of the bottom portion 4b of the separator. The recess 18 has, in the bottom face thereof, an opening which communicates with the hole 17. The recess 18 also has a step in the lower part so that when the pin 15 passes through the recess 18, the bottom portion 4b of the separator disposed on the recess 18 can be stably held by the tip of the pin 15.

Figure 3:
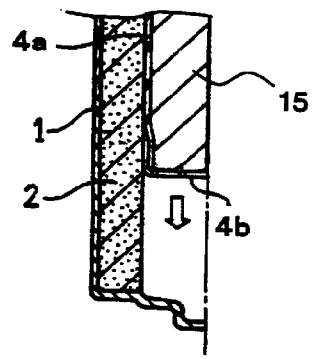
FIG. 3 is a sectional view of the main part of FIG. 2.

Specifically, the pin 15 fitted with the cylindrical portion 4a of the separator is passed through the recess 18 of the jig 16 on which the material of the bottom portion 4b of the separator is disposed and the hole 17, and is inserted into the hollow of the positive electrode 2. The cylindrical portion 4a of the separator is fitted to the pin 15 by rotating the pin 15 so that it is wound around the outer surface of the pin 15. When the pin 15 fitted with the cylindrical portion 4a of the separator passes through the recess 18, the material of the bottom portion 4b of the separator disposed on the recess 18 is fitted to the tip of the pin 15 so as to wrap the lower end of the cylindrical portion 4a of the separator. As a result, as illustrated in FIGS. 2 and 3, the cylindrical portion 4a and the bottom portion 4b of the separator are inserted, together with the pin 15, into the hollow of the positive electrode 2. The major part of the bottom portion 4b is fitted to the lower face of the pin 15, and the peripheral part of the bottom portion 4b protruding from the lower face of the pin 15 extends upward along the side face of the pin 15 so as to overlap the lower end of the cylindrical portion 4a.

With the pin 15 fitted with the cylindrical portion 4a and the bottom portion 4b of the separator, the pin 15 is pushed into the bottom of the battery case 1. Thereafter, the pin 15 is rotated in the direction opposite to the winding direction of the cylindrical portion 4a, so that the pin 15 is pulled out of the hollow of the positive electrode 2. At this time, by rotating the pin 15 in the direction opposite to the winding direction of the cylindrical portion 4a, the cylindrical portion 4a is unwound, so that only the pin 15 is pulled out of the hollow of the positive electrode and the cylindrical portion 4a and the bottom portion 4b of the separator are mounted in the hollow of the positive electrode without being displaced.

Figure 4:
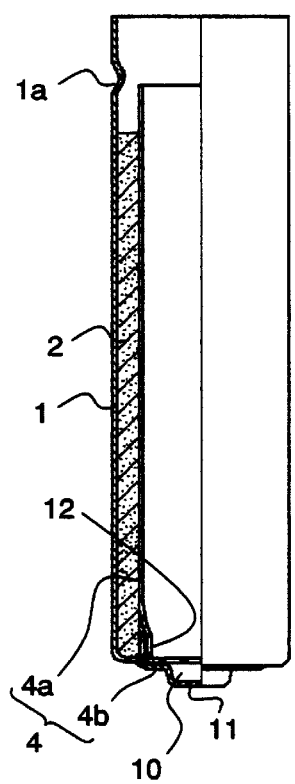
FIG. 4 illustrates the state when the step (2) of the method for producing an alkaline primary battery according to the invention has been completed.

In this manner, as illustrated in FIG. 4, the cylindrical portion 4a of the separator is fitted to the inner side face of the positive electrode 2, and the bottom portion 4b of the separator is fitted to the inner bottom face of the battery case 1 so as to cover the opening of the cylindrical portion 4a of the separator on the bottom side of the battery case 1, in order to form the cylindrical separator 4 with a bottom. The peripheral part of the bottom portion 4b of the separator forms an upstanding portion which extends along the outer face of a lower end part 12 of the cylindrical portion 4a of the separator. The bottom portion 4b of the separator is substantially U-shaped in a cross-section parallel to the axial direction of the cylindrical portion 4a.

The method for inserting such a separator comprising a combination of a cylindrical portion and a bottom portion into a battery case is disclosed in Japanese Laid-Open Patent Publication No. Hei 11-329456. The entire disclosure of Japanese Laid-Open Patent Publication No. Hei 11-329456, including specification, claims, drawings, and summary, is incorporated herein by reference in its entirety.

The cylindrical portion 4a of the separator can be prepared by winding a non-woven fabric sheet around the outer surface of the pin 15 one or more turns while rotating the pin 15. The non-woven fabric has, for example, a thickness of 40 to 150 µm and a weight of 20 to 75 $g/m^2$. The non-woven fabric sheet may be a non-woven fabric or may be composed of a plurality of non-woven fabrics which are laminated. When a plurality of non-woven fabrics are laminated for use, the kind or blend ratio of their fibers may be the same or different.

In terms of the strength and electrolyte retention ability of the separator and the internal resistance of the battery, the thickness of the cylindrical portion 4a of the separator is preferably 0.15 to 1.50 mm.

The non-woven fabric sheet is composed of a mixture of a main fiber and a binder fiber.

Examples of main fibers are alkali-resistant cellulose fibers having good liquid absorption and being capable of fibrillation and alkali-resistant synthetic fibers.

Examples of alkali-resistant cellulose fibers capable of fibrillation include rayon fibers (e.g., polynosic rayon fibers including regenerated cellulose fibers), acetate fibers, and mercerized natural pulp (e.g., wood pulp, cotton linter pulp, and hemp pulp). They may be used singly or in combination.

In terms of the strength of the separator, the alkali-resistant cellulose fibers are preferably solvent spun cellulose fibers which exhibit high crystallinity and strong orientation when fibrillated. When the battery is discharged to some extent, dendrites of zinc oxide grow in the negative electrode, and may penetrate through the separator, thereby coming into contact with the positive electrode to cause an internal short circuit. However, since the above-mentioned cellulose fibers have high strength, penetration of such dendrites through the separator is significantly suppressed.

Examples of alkali-resistant synthetic fibers include polyvinyl alcohol fibers, ethylene-vinyl alcohol copolymer fibers, polypropylene fibers, polyethylene fibers, polyamide fibers, composite fibers of polypropylene fibers and polyethylene fibers, composite fibers of polypropylene fibers and ethylene-vinyl alcohol copolymer fibers, and composite fibers of polyamide fibers and modified polyamide fibers. They may be used singly or in combination.

Examples of binder fibers include polyvinyl alcohol fibers, ethylene-vinyl alcohol copolymer fibers, polyethylene fibers, polyamide fibers, and vinyl chloride-vinyl acetate copolymer fibers. Polyvinyl alcohol fibers, ethylene-vinyl alcohol copolymer fibers, polyethylene fibers, and polyamide fibers may serve as both main fibers and binder fibers. They may be used singly or in combination.

The cylindrical portion of the separator may be composed of a microporous thin film (thickness 5 to 30 μm) of cellophane or polyolefin having good dendrite resistance. Such a non-woven fabric sheet and a microporous thin film as mentioned above may be used in combination. For example, a non-woven fabric sheet may be affixed to one or both faces of a microporous thin film.

The bottom portion of the separator may be made of the same material as that of the cylindrical portion of the separator. The bottom portion of the separator may have a single-layer structure or a multi-layer structure. In the case of a multi-layer structure, the peripheral parts of all the layers form an upstanding portion around the lower end part of the cylindrical portion of the separator.

In order to effectively suppress penetration of dendrites grown in the negative electrode through the separator, the bottom portion of the separator is preferably composed of a combination of such a non-woven fabric sheet and a microporous thin film as mentioned above. More preferably, the bottom portion has a multi-layer structure composed of a microporous thin film and a non-woven fabric affixed to one or both faces of the microporous thin film.

In order to stably dispose the bottom portion 4b of the separator in the battery case 1, it is particularly preferable that the bottom portion 4b of the separator be made of a laminated sheet comprising a microporous thin film (regenerated cellulose) in the shape of a substantial polygon (preferably a substantial square) or a substantial circle and a polyvinyl alcohol fiber non-woven fabric affixed to one or both faces of the microporous thin film.

In order to ensure sufficient strength of the bottom portion 4b of the separator and reduce the internal resistance of the battery sufficiently, the thickness of the bottom portion 4b of the separator is preferably 100 to 500 μm. By setting the thickness of the bottom portion 4b of the separator to 500 μm or less, the internal resistance of the battery can be reduced sufficiently. By setting the thickness of the bottom portion 4b of the separator to 100 μm or more, sufficient strength of the bottom portion of the separator can be ensured. In terms of the internal resistance of the battery and the amount of the negative electrode filled, the thickness of the bottom portion 4b of the separator is more preferably 100 to 180 μm.

In order to stably bring the lower end part 12 of the cylindrical portion 4a of the separator into close contact with the upstanding portion of the bottom portion 4b of the separator, the height (maximum height) of the upstanding portion is preferably 1 to 10 mm. In terms of prevention of displacement of the bottom portion 4b of the separator and the morphological stability, the height of the upstanding portion is more preferably 1.5 to 5 mm.

[Step (3)]

An electrolyte is injected into the cylindrical separator 4 with a bottom. The amount of electrolyte injected therein is set so that most of the electrolyte is absorbed into the positive electrode 2 and the separator 4 and that part of the electrolyte remains in a lower part of the cylindrical separator 4 with the bottom. The lower end part 12 of the cylindrical portion 4a of the separator becomes wet with the remaining electrolyte, and the lower end part 12 is kept into contact with the upstanding portion of the bottom portion of the separator.

Figure 5:
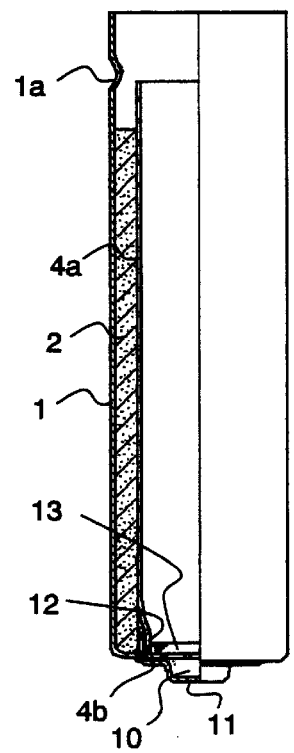
FIG. 5 illustrates the state when the step (3) of the method for producing an alkaline primary battery according to the invention has been completed.

FIG. 5 illustrates the state when the positive electrode and the separator have absorbed the electrolyte in the step (3).

As illustrated in FIG. 5, an electrolyte 13 not absorbed by the positive electrode and the separator remains in a lower part of the cylindrical separator with the bottom.

The electrolyte not absorbed by the positive electrode and the separator may be present in a small amount in a depression 10 in the bottom portion of the battery case. The depression 10 is formed by a cylindrical protrusion 11 with a bottom which is formed on the bottom portion of the battery case 1 as a positive terminal.

Figure 6:
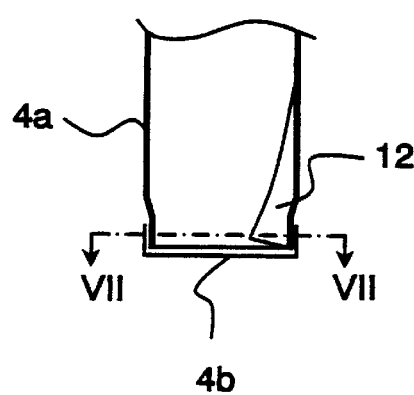
FIG. 6 is a schematic longitudinal sectional view of a separator when a conventional step (C) has been completed.
Figure 7:
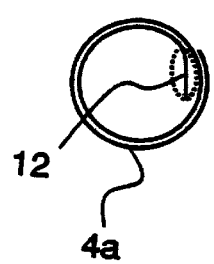
FIG. 7 is a sectional view of the cylindrical portion of the separator illustrated in FIG. 6 taken along the line VII-VII.

FIG. 6 illustrates the state of a separator when the conventional step (C) has been completed. FIG. 7 is a sectional view of the cylindrical portion of the separator of FIG. 6 taken along the line VII-VII. In FIGS. 6 and 7, as an example, the cylindrical portion 4a of the separator is illustrated as being composed of one non-woven fabric sheet which is wound into a cylindrical shape approximately two turns. Upon the completion of the conventional step (C), most of the electrolyte injected into the separator is absorbed by the separator and the positive electrode. In this case, as illustrated in FIGS. 6 and 7, the lower end part 12 of the cylindrical portion 4a of the separator bends inward, causing a problem. It should be noted that the lower end part 12 of the cylindrical portion 4a of the separator is the part overlapping the upstanding portion of the bottom portion 4b of the separator. As illustrated in FIG. 6, the inner end part of the non-woven fabric sheet forming the cylindrical portion 4a of the separator bends inward significantly.

Contrary to this, according to the invention, the surface tension of the electrolyte 13 remaining in the bottom portion of the separator allows the lower end part 12 of the cylindrical portion 4a of the separator to come into close contact with the upstanding portion of the bottom portion of the separator, thereby suppressing inward bending.

The ratio of the weight $W_2$ of the electrolyte remaining in the separator to the weight $W_1$ of the electrolyte injected into the cylindrical separator with the bottom, i.e., the ratio $W_2/W_1$, is preferably from 3/100 to 11/100, and more preferably from 5/100 to 9/100.

In terms of suppressing inward bending of the lower end part of the cylindrical portion of the separator, the lower limit of $W_2/W_1$ is preferably 3/100, and more preferably 5/100. In terms of suppressing the remaining electrolyte from overflowing from the separator when the negative electrode is filled into the separator, the upper limit of $W_2/W_1$ is preferably 11/100, and more preferably 9/100. The range of $W_2/W_1$ may be a combination of such an upper limit and a lower limit as described above.

When $W_2/W_1$ is from 3/100 to 11/100, the height H of the part of the lower end part 12 of the cylindrical portion 4a immersed in the remaining electrolyte 13 in the axial direction is approximately 0.4 to 2 mm.

In the step (3), in order to cause the separator and the positive electrode to absorb the large amount of electrolyte in a short period of time, it is preferable to impregnate the separator and the positive electrode with the electrolyte at a reduced pressure. In terms of productivity and reliability, the time for which the electrolyte is impregnated at a reduced pressure is preferably 1 to 5 minutes. In order to prevent the electrolyte from scattering and impregnate the separator and the positive electrode with the electrolyte efficiently, it is preferable to perform the step of reducing the pressure from atmospheric pressure (approximately 1013 hPa) to 60 to 500 hPa in 5 to 30 seconds. Thereafter, the separator and the positive electrode contained in the battery case may be left at a certain reduced pressure for a predetermined time (e.g., 0 to 30 seconds), or the above-mentioned pressure reducing step may be repeated. Also, before the pressure reducing step is performed, the electrolyte may be impregnated at atmospheric pressure for a predetermined time (e.g., 3 to 10 minutes).

According to the conventional technique, as the pressure reducing speed becomes higher, the electrolyte absorbing speed becomes higher, and the lower end part of the cylindrical portion of the separator tends to bend inward. Contrary to this, by employing the alkaline primary battery production method of the invention, it is possible to heighten the pressure reducing speed to shorten the time necessary to absorb the electrolyte while suppressing inward bending of the lower end part of the cylindrical portion of the separator.

Also, the cylindrical separator with the bottom and the positive electrode may be impregnated with the electrolyte at atmospheric pressure. In terms of productivity and reliability, the time of electrolyte impregnation at atmospheric pressure is preferably 5 to 20 minutes.

At least during the period after the step (3) of injecting the electrolyte into the separator and before the step (4) described below, care should be taken to ensure that the separator and the positive electrode are impregnated with the electrolyte and that the electrolyte remains in the bottom portion of the separator.

The electrolyte is preferably a potassium hydroxide aqueous solution with a concentration of 32 to 40% by weight. In terms of the electrical conductivity of the electrolyte, the lower limit of the potassium hydroxide concentration in the electrolyte is preferably 32% by weight, and more preferably 34% by weight. In order to obtain good intermittent discharge characteristics, the upper limit of the potassium hydroxide concentration in the electrolyte is preferably 40% by weight, and more preferably 38% by weight. The range of the potassium hydroxide concentration in the electrolyte can be a combination of such an upper limit and a lower limit as mentioned above.

In order to suppress generation of hydrogen gas from the negative electrode upon charge due to reversed connection, zinc oxide may be further added to the electrolyte. The zinc oxide concentration in the electrolyte is preferably 1 to 5% by weight, and more preferably 1 to 3% by weight. When the zinc oxide concentration in the electrolyte is 1% by weight or more, generation of hydrogen gas from the negative electrode upon charge due to reversed connection can be effectively suppressed. When the zinc oxide concentration in the electrolyte is 5% by weight or less, deterioration in high-load discharge characteristics can be suppressed.

The same electrolyte as that described above can be used as the electrolyte used to prepare the positive electrode pellets and the negative electrode.

[Step (4)]

The gelled negative electrode 3 is filled into the cylindrical separator 4 with the bottom. At this time, the electrolyte remaining in the bottom portion of the separator 4 in the step (3) diffuses into the negative electrode 3.

The negative electrode to be filled into the separator is prepared by adding a gelling agent and an electrolyte to a negative electrode active material in a predetermined ratio.

The amount of the gelling agent added is preferably 0.5 to 2 parts by weight per 100 parts by weight of the negative electrode active material. In order to facilitate the diffusion of the electrolyte remaining in the separator 3 into the negative electrode, the amount of the gelling agent added is more preferably 1 to 1.5 parts by weight per 100 parts by weight of the negative electrode active material. The gelling agent can be, for example, a polyacrylate such as sodium polyacrylate.

In terms of the negative electrode capacity and the filling properties, the amount of the electrolyte in the negative electrode filled into the separator is preferably 40 to 60 parts by weight per 100 parts by weight of the negative electrode active material. In consideration of the amount of the electrolyte injected into the separator in the step (3) and the total amount of the electrolyte in the battery, the amount of the electrolyte in the negative electrode filled into the separator is more preferably 44 to 54 parts by weight per 100 parts by weight of the negative electrode active material.

The negative electrode active material can be a zinc or zinc alloy powder.

In terms of the filling properties of the negative electrode and the negative electrode capacity, the mean particle size of the negative electrode active material is preferably 80 to 250 µm. The mean particle size of the negative electrode active material is more preferably 100 to 200 µm since the electrolyte remaining in the separator 4 can easily diffuse into the negative electrode.

In terms of the corrosion resistance, the zinc alloy preferably includes at least one of Bi, In, and Al. The Bi content in the zinc alloy is preferably 0.0025 to 0.05% by weight. The In content in the zinc alloy is preferably 0.01 to 0.1% by weight. The Al content in the zinc alloy is preferably 0.003 to 0.03% by weight. The ratio of the other element(s) than zinc in the zinc alloy is preferably 0.02 to 0.08% by weight.

[Step (5) and Step (6)]

The seal unit 9 is fitted to the opening of the battery case 1 so that the outer cylindrical portion 5b of the seal unit 9 rests on the step 1a of the battery case 1. The seal unit 9 is composed of the resin gasket 5, the negative electrode current collector 6 in the shape of a nail, and the negative terminal plate 7. The head 6a of the negative electrode current collector 6 is welded to the central flat portion of the negative terminal plate 7.

The body of the negative electrode current collector 6 is inserted into the negative electrode 3. The open edge of the battery case 1 is crimped onto the brim of the negative terminal plate 7 with the outer cylindrical portion 5b of the gasket 5 interposed therebetween, to seal the opening of the battery case 1. At this time, depending on the production conditions of the battery and how the battery is installed (when the battery is installed with the positive terminal facing downward), there may be some electrolyte in the depression. Also, depending on how the battery is installed, the electrolyte in the depression may diffuse into the negative electrode and the like.

EXAMPLES

Examples of the invention are hereinafter described in detail, but the invention is not to be construed as being limited to these Examples.

Example 1

A battery with the structure illustrated in FIG. 1 was produced in the following manner.

[Step (1)]

An electrolytic manganese dioxide powder (Tosoh Corporation, HHTF, mean particle size 35 μm) serving as a positive electrode active material and a graphite powder (Nippon Graphite Industries, Ltd., SP-20, mean particle size 10 μm) serving as a conductive agent were mixed in a weight ratio of 95:5. This mixture was mixed with an electrolyte in a weight ratio of 100:2, sufficiently stirred, and pressed into flakes. The electrolyte used was an aqueous solution containing potassium hydroxide (KOH concentration: 35% by weight) and zinc oxide (ZnO concentration: 2% by weight). The flakes of the positive electrode mixture were crushed into granules, which were then classified with a sieve. The granules of 10 to 100 mesh were compression molded into the shape of a hollow cylinder, to obtain positive electrode pellets 2a (outer diameter 13.55 mm, internal diameter 9.15 mm, height 22 mm, weight 5.55 g).

Two positive electrode pellets thus prepared were inserted into a cylindrical battery case 1 (outer diameter 14 mm, internal diameter 13.7 mm, height 51.8 mm, thickness of side portion 0.15 mm, thickness of bottom portion 0.4 mm) having a bottom portion with a protrusion 11 (positive terminal). They were pressed to form a cylindrical positive electrode 2 (outer diameter 13.7 mm, internal diameter 9.05 mm, height 42.5 mm, weight 11.1 g) having a hollow and adhering closely to the battery case 1. The total weight of manganese dioxide and graphite was 3.21 g per 1 $cm^3$ of the positive electrode 2. Thereafter, the battery case 1 was recessed near the opening to form a step 1a.

[Step (2)]

Using a cylindrical pin 15, a non-woven fabric (thickness 110 μm, weight 27 $g/m^2$) was wound three turns to form a 0.33-mm thick cylindrical portion 4a of a separator. The non-woven fabric used was composed of a mixture of 50 parts by weight of rayon fibers and 50 parts by weight of polyvinyl alcohol fibers.

Using a jig 16, a bottom portion 4b of the separator was fitted to the tip of the pin 15 fitted with the cylindrical portion 4a of the separator. With the bottom portion 4b of the separator wrapping the end of the cylindrical portion 4a of the separator, the cylindrical portion 4a and the bottom portion 4b of the separator were inserted, together with the pin 15, into the hollow of the positive electrode 2. In this manner, the cylindrical portion 4a of the separator was fitted to the inner wall of the positive electrode 2, and the bottom portion 4b of the separator was fitted to the bottom portion of the battery case 1. In this manner, a cylindrical separator 4 with a bottom was mounted.

The material of the bottom portion 4b of the separator was a 0.110-mm thick laminated sheet comprising a thin film of regenerated cellulose (thickness 0.03 mm) and a non-woven fabric of polyvinyl alcohol fibers (thickness 0.04 mm) affixed to each side of the thin film, which was cut to a square (15 mm×15 mm) larger than the outer diameter of the cylindrical portion 4a of the separator. The upstanding portion of the bottom portion 4b of the separator had a height of 2 to 3 mm.

[Step (3)]

An electrolyte with the same composition as that described above was injected into the separator 4. At this time, the weight $W_1$ of the electrolyte injected into the separator was varied as shown in Tables 1 and 2.

Under the following first or second condition, the separator and the positive electrode were sufficiently impregnated with the electrolyte.

First condition: leave the separator and the positive electrode contained in the battery case at atmospheric pressure for 15 minutes.

Second condition: leave them at atmospheric pressure for 10 minutes, and then reduce the pressure in a sealed chamber from atmospheric pressure (approximately 1013 hPa) to 100 hPa at a speed of approximately 10 hPa/sec in 15 seconds.

[Step (4)]

Thereafter, a gelled negative electrode 3 was filled into the separator 4. The negative electrode 3 was prepared by mixing sodium polyacrylate serving as a gelling agent, an electrolyte with the same composition as that described above, and a zinc powder (mean particle size 150 μm) serving as a negative electrode active material in a weight ratio of 0.8:33:66.2.

[Step (5) and Step (6)]

A seal unit 9 was prepared by welding a head 6a of a nail-shaped negative electrode current collector 6 to the flat portion of a negative terminal plate 7, and inserting the end of a body 6b of the negative electrode current collector 6 into the hole of a central cylindrical portion 5a of a nylon gasket 5 until the head 6a is fitted to the gasket 5. The seal unit 9 was fitted to the opening of the battery case 1 so that an outer cylindrical portion 5b of the gasket 5 included in the seal unit 9 rested on a step 1a of the battery case 1. At this time, the body 6b of the negative electrode current collector 6 was inserted into the negative electrode 3. The open edge of the battery case 1 was crimped onto the brim of the negative terminal plate 7 with the outer cylindrical portion 5b of the gasket 5 interposed therebetween, to seal the opening of the battery case 1. The outer surface of the battery case 1 was covered with an outer label 8. In this manner, AA-size alkaline dry batteries (LR6) Nos. 1 to 8 were produced.

[Evaluation]

(1) Measurement of Ratio $W_2/W_1$ (the Ratio of the Weight $W_2$ of the Remaining Electrolyte to the Weight $W_1$ of the Electrolyte Injected into the Separator)

The weight $W_2$ of the electrolyte remaining in the separator in the step (3) was measured by the following method. Under the conditions shown in Table 1 or Table 2, the positive electrode and the separator were allowed to absorb the electrolyte, and the battery case was then slanted approximately 30 to 60 degrees to collect the electrolyte remaining in the separator into one area. In this state, the electrolyte remaining in the separator was sucked with a dropper. With the bottom portion 4b of the separator illuminated with a flashlight, this sucking operation was repeated until the remaining electrolyte became invisible. The total amount of the sucked electrolyte was determined as the weight $W_2$ of the remaining electrolyte.

The ratio $W_2/W_1$ was calculated from the weight $W_1$ of the electrolyte injected in the step (3) and the weight $W_2$ of the remaining electrolyte thus determined. It should be noted that five batteries were tested for each of Nos. 1 to 8 to obtain an average value.

(2) Battery Evaluation

After batteries were produced, they were left at room temperature for a week, and the open-circuit voltages of the batteries were measured in an environment of 20° C. Batteries with an open-circuit voltage of less than 1.620 V were selected, and these batteries were disassembled. Batteries which were short-circuited due to overflowing of the negative electrode from the separator were defined as defective batteries. For each of Nos. 1 to 8, 5000 batteries were tested, and the number of defective batteries was obtained.

The evaluation results are shown in Tables 1 and 2.

TABLE 1

| Experiment No. | Electrolyte impregnation process | Weight $W_1$ of electrolyte injected into separator (g) | Weight $W_2$ of remaining electrolyte (g) | $W_2/W_1$ | Number of defective batteries |
|---|---|---|---|---|---|
| 1 | First condition | 1.50 | 0 | 0 | 7 |
| 2 |  | 1.55 | 0 | 0 | 2 |
| 3 |  | 1.60 | 0.05 | 3/100 | 0 |
| 4 |  | 1.67 | 0.15 | 7/100 | 0 |
| 5 |  | 1.74 | 0.19 | 11/100 | 0 |

TABLE 2

| Experiment No. | Electrolyte impregnation process | Weight $W_1$ of electrolyte injected into separator (g) | Weight $W_2$ of remaining electrolyte (g) | $W_2/W_1$ | Number of defective batteries |
|---|---|---|---|---|---|
| 6 | Second condition | 1.50 | 0 | 0 | 19 |
| 7 |  | 1.67 | 0 | 0 | 5 |
| 8 |  | 1.80 | 0.13 | 7/100 | 0 |

When $W_2/W_1$ was 3/100 and 11/100, the height H of the part of the lower end part 12 of the cylindrical portion 4a immersed in the remaining electrolyte 13 in the axial direction was approximately 0.4 mm and approximately 2 mm, respectively.

The height H was determined by the following method. In the step (3), the electrolyte was injected for absorption under the conditions of Nos. 3 and 5 shown in Table 1. Immediately after that, an Al rod (diameter: 1 mm) was inserted into the separator, and the Al rod was put upright on the bottom portion of the separator. In this manner, the lower end of the Al rod was immersed in the remaining electrolyte. The time for which the lower end of the Al rod was immersed in the remaining electrolyte was one second. Thereafter, the Al rod was taken out of the separator, and the length of the part of the Al rod immersed in the remaining electrolyte was measured. Specifically, the length of the part of the Al rod whose surface was discolored white due to the immersion in the electrolyte, which is an alkali aqueous solution, was measured, and the measured value was defined as the height H. When the Al rod is put upright on the bottom portion 4b of the separator immediately above the depression 10 of the battery case, the bottom portion 4b of the separator may deform. Thus, the location of the bottom portion 4b of the separator on which the Al rod was to be put upright was slightly shifted outward from immediately above the depression 10 of the battery case. It should be noted that the ratio of the cross-section of the Al rod (diameter: 1 mm) to the area of the bottom portion (diameter: approximately 8 mm) of the separator is 1/64, which is very small. Therefore, the change in the electrolyte level caused by the immersion of the Al rod in the remaining electrolyte is very small, and the effect of such change was assumed to be substantially zero and negligible.

In the case of Nos. 3 to 5 and 8, there were no defective batteries. In Nos. 3 to 5 and 8, the electrolyte in an amount sufficient to come into contact with the lower end part of the cylindrical portion of the separator remained on the bottom of the battery in the step (3). It was thus possible to prevent the lower end part of the cylindrical portion of the separator from bending inward in a reliable manner.

In the case of Nos. 1, 2, 6, and 7, there were defective batteries. The inside of each defective battery was examined by performing a CT scan on the body of the battery with a SHIMAZU SMX-225 CTSV. As a result, it was found that due to inward bending of the lower end part of the separator, the negative electrode overflowed from the separator, thereby coming into contact with the positive electrode to cause an internal short circuit. Table 2 shows conditions of electrolyte injection at a reduced pressure. In the case of Nos. 6 and 7 in which there was no remaining electrolyte, many of the batteries became internally short-circuited due to inward bending of the lower end part of the separator.

The alkaline dry battery of the invention has high reliability and is advantageously used as the power source for electronic devices such as portable appliances and information devices.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A method for producing an alkaline primary battery, comprising the steps of:
   (1) inserting at least one hollow cylindrical positive electrode pellet into a cylindrical battery case with a bottom and pressing the at least one positive electrode pellet to form a cylindrical positive electrode having a hollow and adhering closely to an inner face of the battery case;
   (2) inserting a cylindrical separator with a bottom into the hollow of the positive electrode inside the battery case, the separator including: a wound cylindrical portion; and a bottom portion that is substantially U-shaped in cross-section, the bottom portion covering an opening of the cylindrical portion at a lower end of the cylindrical portion and having an upstanding portion that extends along a lower outer face of the cylindrical portion;
   (3) injecting an electrolyte into the separator to impregnate the positive electrode and the separator with the electrolyte;
   (4) filling a gelled negative electrode into the separator;
   (5) inserting a negative electrode current collector into the negative electrode; and
   (6) sealing an opening of the battery case,
   wherein the amount of the electrolyte injected into the separator in the step (3) is sufficient so as to impregnate the positive electrode and the separator and immerse a lower end of the cylindrical portion of the separator in the electrolyte remaining in the separator without being absorbed by the positive electrode and the separator, thereby bringing the lower end of the cylindrical portion into contact with the upstanding portion of the bottom portion.

2. The method for producing an alkaline primary battery in accordance with claim 1, wherein the ratio $W_2/W_1$ of the weight $W_2$ of the remaining electrolyte to the weight $W_1$ of the electrolyte injected into the separator in the step (3) is from 3/100 to 11/100.

3. The method for producing an alkaline primary battery in accordance with claim 2, wherein the ratio $W_2/W_1$ is from 5/100 to 9/100.

4. The method for producing an alkaline primary battery in accordance with claim 1, wherein in the step (3), the positive electrode and the separator are impregnated with the injected electrolyte at a reduced pressure.

5. The method for producing an alkaline primary battery in accordance with claim 1, wherein the cylindrical portion of the separator comprises polyvinyl alcohol fibers.

6. The method for producing an alkaline primary battery in accordance with claim 1, wherein the electrolyte injected into the separator in the step (3) is a potassium hydroxide aqueous solution with a concentration of 32 to 40% by weight.

7. The method for producing an alkaline primary battery in accordance with claim 6, wherein the electrolyte is a potassium hydroxide aqueous solution with a concentration of 34 to 38% by weight.

8. The method for producing an alkaline primary battery in accordance with claim 1, wherein the positive electrode formed in the step (1) includes manganese dioxide and graphite.

9. The method for producing an alkaline primary battery in accordance with claim 8, wherein the total weight of manganese dioxide and graphite is 3.05 to 3.33 g per 1 $cm^3$ of the positive electrode formed in the step (1).

10. The method for producing an alkaline primary battery in accordance with claim 9, wherein the total weight of manganese dioxide and graphite is 3.14 to 3.30 g per 1 $cm^3$ of the positive electrode formed in the step (1).

* * * * *